United States Patent
Lee et al.

(10) Patent No.: US 10,476,625 B2
(45) Date of Patent: Nov. 12, 2019

(54) OPTICAL NETWORK SYSTEM USING WAVELENGTH CHANNELS INCLUDED IN O-BAND

(71) Applicant: ELECTRONICS AND TELECOMMUNICATIONS RESEARCH INSTITUTE, Daejeon (KR)

(72) Inventors: Han Hyub Lee, Daejeon (KR); Heuk Park, Daejeon (KR); Hwan Seok Chung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/798,807

(22) Filed: Oct. 31, 2017

(65) Prior Publication Data

US 2018/0123723 A1    May 3, 2018

(30) Foreign Application Priority Data

Oct. 31, 2016 (KR) .................. 10-2016-0143480
Oct. 11, 2017 (KR) .................. 10-2017-0131583

(51) Int. Cl.
*H04J 14/02* (2006.01)
*H04B 10/572* (2013.01)
(Continued)

(52) U.S. Cl.
CPC .......... *H04J 14/0227* (2013.01); *H04B 10/27* (2013.01); *H04B 10/572* (2013.01);
(Continued)

(58) Field of Classification Search
CPC .... H04B 10/27; H04B 10/572; H04J 14/0227
See application file for complete search history.

(56) References Cited

U.S. PATENT DOCUMENTS 8,824,890 B2    9/2014 Lee et al.
2006/0257148 A1*  11/2006 Hirth .................. H04B 10/2537
                                                                398/71
(Continued)

FOREIGN PATENT DOCUMENTS

JP    2013-044991 A2    3/2013
JP    2015-019284 A2    1/2015

*Primary Examiner* — Dzung D Tran
(74) *Attorney, Agent, or Firm* — LRK Patent Law Firm (57) ABSTRACT

Wavelength channels used in the optical network system are classified into downstream channels used to transmit optical signals from an optical line terminal (OLT) to an optical network unit (ONU) and upstream channels that are used to transmit optical signals from the ONU to the OLT. The wavelength channels are included in an O-band and may not overlap each other. One of the upstream channels are allocated to a wavelength band (for example, a zero-dispersion window) in which a four-wave mixing occurs. A wavelength spacing between the upstream channels and the downstream channels is determined based on a performance of separating the upstream channels and the downstream channels in a bidirectional optical sub assembly (BOSA) of the ONU. Also, a wavelength spacing between the downstream channels is determined based on a performance of separating the downstream channels in the BOSA.

11 Claims, 7 Drawing Sheets

(51) Int. Cl.
*H04B 10/27* (2013.01)
*H04J 14/08* (2006.01)

(52) U.S. Cl.
CPC ...... *H04J 14/0241* (2013.01); *H04J 14/0282* (2013.01); *H04J 14/08* (2013.01)

(56) References Cited

U.S. PATENT DOCUMENTS

| | | | |
|---|---|---|---|
| 2008/0089692 A1* | 4/2008 | Sorin | H04J 14/02 398/135 |
| 2008/0292316 A1* | 11/2008 | Litvin | H04J 14/0224 398/79 |
| 2009/0010649 A1* | 1/2009 | Zuhdi | H04J 14/0226 398/59 |
| 2009/0016726 A1* | 1/2009 | Suzuki | H04B 10/0793 398/79 |
| 2012/0008958 A1* | 1/2012 | Dahlfort | H04J 14/0226 398/85 |
| 2012/0099814 A1* | 4/2012 | Hood | G02B 6/2817 385/24 |
| 2012/0128360 A1 | 5/2012 | Lee et al. | |
| 2013/0302029 A1 | 11/2013 | Lee et al. | |

\* cited by examiner

| Channel name | Center frequency (THz) | Center wavelength (nm) | Wavelength range (nm) |
|---|---|---|---|
| DC0 | $f_{DC0}$ | $\lambda_{DC0}$ | $R_{DC0}$ |
| DC1 | $f_{DC1}$ | $\lambda_{DC1}$ | $R_{DC1}$ |
| DC2 | $f_{DC2}$ | $\lambda_{DC2}$ | $R_{DC2}$ |
| DC3 | $f_{DC3}$ | $\lambda_{DC3}$ | $R_{DC3}$ |

520

| Channel name | Center frequency (THz) | Center wavelength (nm) | Wavelength range (nm) |
|---|---|---|---|
| UC0 | $f_{UC0}$ | $\lambda_{UC0}$ | $R_{UC0}$ |
| UC1 | $f_{UC1}$ | $\lambda_{UC1}$ | $R_{UC1}$ |
| UC2 | $f_{UC2}$ | $\lambda_{UC2}$ | $R_{UC2}$ |
| UC3 | $f_{UC3}$ | $\lambda_{UC3}$ | $R_{UC3}$ |

OPTICAL NETWORK SYSTEM USING WAVELENGTH CHANNELS INCLUDED IN O-BAND

CROSS-REFERENCE TO RELATED APPLICATION(S)

This application claims the priority benefit of Korean Patent Application No. 10-2016-0143480, filed on Oct. 31, 2016, and Korean Patent Application No. 10-2017-0131583, filed on Oct. 11, 2017, in the Korean Intellectual Property Office, the disclosures of which are incorporated herein by reference for all purposes.

BACKGROUND

1. Field of the Invention

One or more example embodiments relate to a passive optical network (PON).

2. Description of Related Art

A passive optical network (PON) is a network capable of providing higher-quality services by connecting a service provider and a subscriber using an optical infrastructure. A time division multiplexing (TDM)-PON is a PON in which a plurality of subscribers divide and use optical signals in time while sharing an optical signal with a single wavelength. To increase a data bandwidth of a PON while minimizing a change in an optical infrastructure, wavelength division multiplexing (WDM) may be applied to the TDM-PON. The TDM-PON to which the WDM is applied is referred to as a "WT-PON." When an optical network unit (ONU) included in the WT-PON performs an upstream transmission and a downstream transmission, a plurality of wavelengths may need to be efficiently assigned.

SUMMARY

An aspect provides an optical network system using wavelength channels included in an O-band.

Another aspect also provides an optical network system in which a wavelength spacing between an upstream channel and a downstream channel is set based on a performance of a band splitting filter of a bidirectional optical sub assembly (BOSA).

Another aspect also provides an optical network system in which an upstream channel and a downstream channel are set based on a zero-dispersion window included in an O-band.

Another aspect also provides an optical network system in which a wavelength spacing between downstream channels is set based on a downstream optical signal selection filter that separates the downstream channels.

According to an aspect, there is provided a data transmission method performed by an optical line terminal (OLT), the data transmission method including identifying data that is to be transmitted to an optical network unit (ONU) connected to the OLT, and transmitting the data to the ONU via at least one of wavelength channels used for an optical transmission between the OLT and the ONU, wherein the wavelength channels are used to transmit the data from the OLT to the ONU, and include upstream channels that are used for an upstream transmission from the ONU to the OLT and downstream channels that have longer wavelengths than those of the upstream channels and that are spaced apart by a preset wavelength spacing from the upstream channels.

At least one of the upstream channels may be determined to be included in a preset wavelength band.

The downstream channels may be classified into a first downstream channel through an N-th downstream channel in an ascending order of wavelengths and N may be an integer greater than or equal to "3." A spacing between the first downstream channel and a second downstream channel may be greater than a spacing between an (N−1)-th downstream channel and the N-th downstream channel.

The wavelength channels may have center frequencies selected from an O-band wavelength range between 1260 nanometers (nm) to 1360 nm.

According to another aspect, there is provided a data reception method performed by an OLT, the data reception method including performing a connection to an ONU, and receiving data from the ONU via at least one of wavelength channels used for an optical transmission between the OLT and the ONU, wherein the wavelength channels are used to transmit the data from the ONU to the OLT and include upstream channels that have shorter wavelengths than those of downstream channels and that are spaced apart by a preset wavelength spacing from the downstream channels, and the downstream channels that are used for a downstream transmission from the OLT to the ONU.

An upstream channel with a longest wavelength among the upstream channels may be included in a preset wavelength band.

At least one of the upstream channels may be included in a preset wavelength band.

The preset wavelength band may include a wavelength band that allows a value of a chromatic dispersion occurring in an optical fiber that connects the OLT and the ONU to be zero.

The downstream channels may be classified into a first downstream channel through an N-th downstream channel in an ascending order of wavelengths and N may be an integer greater than or equal to "3." A spacing between the first downstream channel and a second downstream channel may be greater than a spacing between an (N−1)-th downstream channel and the N-th downstream channel.

The wavelength channels may have center frequencies selected from an O-band wavelength range between 1260 nm to 1360 nm.

According to another aspect, there is provided a data transmission method performed by an ONU, the data transmission method including identifying data that is to be transmitted to an OLT connected to the ONU, and transmitting the data to the OLT via at least one of wavelength channels used for an optical transmission between the OLT and the ONU, wherein the wavelength channels are used to transmit the data from the ONU to the OLT and include upstream channels that have shorter wavelengths than those of downstream channels and that are spaced apart by a preset wavelength spacing from the downstream channels, and the downstream channels that are used for a downstream transmission from the OLT to the ONU.

An upstream channel with a longest wavelength among the upstream channels may be included in a preset wavelength band.

At least one of the upstream channels may be included in a preset wavelength band.

The preset wavelength band may include a wavelength band that allows a value of a chromatic dispersion occurring in an optical fiber that connects the OLT and the ONU to be zero.

The downstream channels may be classified into a first downstream channel through an N-th downstream channel in an ascending order of wavelengths and N may be an integer greater than or equal to "3." A spacing between the first downstream channel and a second downstream channel may be greater than a spacing between an (N−1)-th downstream channel and the N-th downstream channel.

The wavelength channels may have center frequencies selected from an O-band wavelength range between 1260 nm to 1360 nm.

According to another aspect, there is provided a data reception method performed by an ONU, the data reception method including performing a connection to an OLT and receiving data from the OLT via at least one of wavelength channels used for an optical transmission between the OLT and the ONU, wherein the wavelength channels are used to transmit the data from the OLT to the ONU and include upstream channels that are used for an upstream transmission from the ONU to the OLT and downstream channels that have longer wavelengths than those of the upstream channels and that are spaced apart by a preset wavelength spacing from the upstream channels.

At least one of the upstream channels may be determined to be included in a preset wavelength band.

The downstream channels may be classified into a first downstream channel through an N-th downstream channel in an ascending order of wavelengths and N may be an integer greater than or equal to "3." A spacing between the first downstream channel and a second downstream channel may be greater than a spacing between an (N−1)-th downstream channel and the N-th downstream channel.

The wavelength channels may have center frequencies selected from an O-band wavelength range between 1260 nm to 1360 nm.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Figure 1:
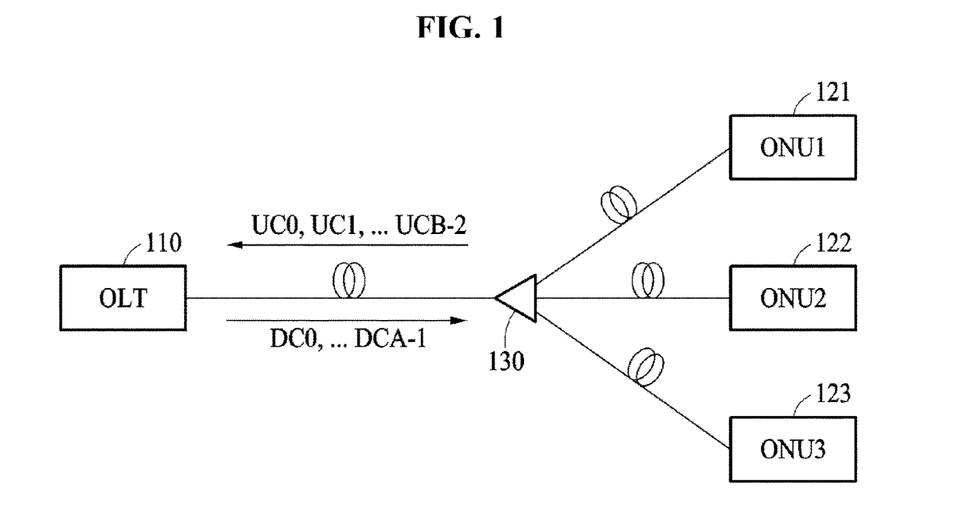
FIG. 1 is a diagram illustrating an example of a structure of an optical network system according to an example embodiment.

FIG. 1 is a diagram illustrating an example of a structure of an optical network system according to an example embodiment. The optical network system may be a passive optical network (PON), and may be an optical network that is based on an Ethernet PON (EPON) or a gigabit-capable PON (GPON).

Referring to FIG. 1, the optical network system may include an optical line terminal (OLT) 110 that is a device used by a service provider that provides a service via an optical network. The OLT 110 may be installed in a central office (CO) of the optical network. The optical network system may include an optical network unit (ONU) that is a device accessed by a subscriber that receives a provided service. The optical network system may include an optical distribution network (ODN) that connects the OLT 110 and at least one ONU. Referring to FIG. 1, an ONU 1 121, an ONU 2 122 and an ONU 3 123 may be connected to the OLT 110 over the ODN.

The ODN may be configured with an optical infrastructure that connects the OLT 110 and the ONU 1 121 through the ONU 3 123, and the optical infrastructure may include an optical fiber and an optical splitter 130. The optical splitter 130 may distribute optical signals received from the OLT 110 to the optical fiber that is connected to each of the ONU 1 121 through the ONU 3 123. The optical signals distributed to the optical fiber connected to each of the ONU 1 121 through the ONU 3 123 may have the same signal intensity. Also, optical signals generated in the ONU 1 121 through the ONU 3 123 may be multiplexed into a single optical signal in the optical splitter 130 and may be transmitted to the OLT 110. In the following description, a transmission of an optical signal from the OLT 110 to the ONU 1 121 through the ONU 3 123 is referred to as a "downstream transmission," and a transmission of an optical signal from one of the ONU 1 121 through the ONU 3 123 to the OLT 110 referred to as an "upstream transmission."

The OLT 110 and the ONU 1 121 through the ONU 3 123 included in the optical network system may transmit or receive an optical signal using one or more wavelength channels with different center wavelengths. FIG. 1 illustrates "A" downstream channels, for example, downstream channels DC0, DC1 and DCA-1, used for a downstream transmission, and "B" upstream channels, for example, upstream channels UC0, UC1 and UCB-1, used for an upstream transmission. The "A" downstream channels and the "B" upstream channels may have different center frequencies. The "A" downstream channels and the "B" upstream channels may be included in an O-band with a wavelength range of 1260 nanometers (nm) to 1360 nm (corresponding to a frequency band of 238.1 terahertz (THz) to 220.6 THz). The OLT 110 and the ONU 1 121 through the ONU 3 123 may transmit and receive optical signals using wavelengths in the O-band, and thus an amount of chromatic dispersion may be reduced. Due to a reduction in the amount of chromatic dispersion, it is possible to prevent a degradation from occurring in an optical signal that uses a 25G non-return-to-zero (NRZ) modulation scheme.

The optical network system may be a WT-PON that is a time division multiplexing (TDM)-PON to which wavelength division multiplexing (WDM) is applied. For example, the ONU 1 121 through the ONU 3 123 may transmit optical signals to the OLT 110 using an upstream channel at different times, and accordingly may share the upstream channel. Also, the ONU 1 121 through the ONU 3 123 may use different upstream channels to simultaneously transmit optical signals to the OLT 110. Furthermore, one of the ONU 1 121 through the ONU 3 123 may use a plurality of upstream channels at the same time, to transmit an optical signal to the OLT 110. An operation performed using the above-described upstream channel may be similarly performed in a downstream channel.

The optical network system may use a WT-PON, and accordingly the OLT 110 and the ONU 1 121 through the ONU 3 123 may transmit and receive data at a transmission rate higher than or equal to a maximum transmission rate supported by a single wavelength channel. For example, it is assumed that an optical signal is transmitted and received via a single wavelength channel at a transmission rate of up to 25 gigabits per second (Gb/s) and that the ONU 1 121 transmits an optical signal to the OLT 110 simultaneously using two upstream channels. In an example, when the ONU 1 121 simultaneously outputs optical signals at a transmission rate of 25 Gb/s using the two upstream channels, the ONU 1 121 may have the same effect as that of transmitting a single optical signal at a transmission rate of 50 Gb/s obtained by "25 Gb/s×2." In another example, when the ONU 1 121 simultaneously outputs optical signals using four upstream channels, the ONU 1 121 may have the same effect as that of transmitting a single optical signal at a transmission rate of 100 Gb/s obtained by "25 Gb/s×4." Thus, a bandwidth of data that may be transmitted by the OLT 110 and the ONU 1 121 through the ONU 3 123 may increase based on a number of wavelength channels that are used.

Figure 2:
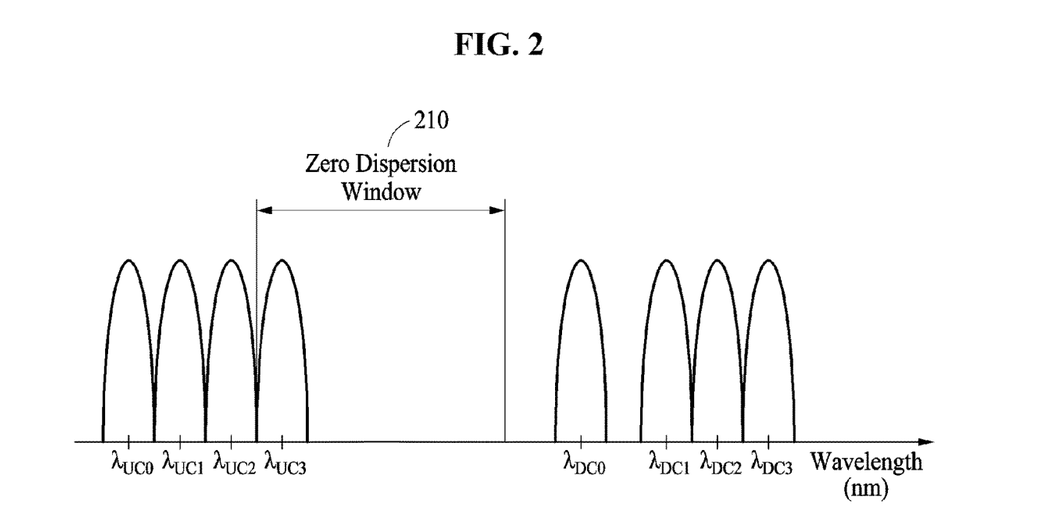
FIG. 2 is a graph illustrating an example of wavelength channels used by an optical network system according to an example embodiment.

A center wavelength (or a center frequency) and a wavelength range of each of the "A" downstream channels and the "B" upstream channels may be determined to easily transmit and receive an optical signal in the WT-PON. FIG. 2 is a graph illustrating an example of wavelength channels used by an optical network system according to an example embodiment. In the following description, it is assumed that four downstream channels and four upstream channels are used by the optical network system and that each of the wavelength channels support a transmission of an optical signal at a transmission rate of up to 25 Gb/s.

FIG. 2 illustrates center wavelengths $\lambda_{UC0}$ through $\lambda_{UC3}$ of the four upstream channels, for example, upstream channels UC0 through UC3, used in the optical network system, in an ascending order of wavelengths. Also, FIG. 2 illustrates center wavelengths $\lambda_{DC0}$ through $\lambda_{DC3}$ of the four downstream channels, for example, downstream channels DC0 through DC3, used in the optical network system, in an ascending order of wavelengths. All the wavelength channels of the optical network system may be included in an O-band. In this example, the center wavelengths $\lambda_{UC0}$ through $\lambda_{UC3}$ and $\lambda_{DC0}$ through $\lambda_{DC3}$ may range from 1260 nm to 1360 nm. The center wavelengths $\lambda_{UC0}$ through $\lambda_{UC3}$ of the upstream channels may be shorter than the center wavelengths $\lambda_{DC0}$ through $\lambda_{DC3}$ of the downstream channels. In other words, the center wavelengths $\lambda_{DC0}$ through $\lambda_{DC3}$ may be longer than the center wavelengths $\lambda_{UC0}$ through $\lambda_{UC3}$. Also, the wavelength channels may not overlap each other.

Center wavelengths (or center frequencies) and wavelength ranges of the upstream channels and downstream channels may be determined based on a feature of an optical fiber that connects an OLT and an ONU. When an optical signal is propagated to an optical fiber, a phenomenon (called a "chromatic dispersion") in which a propagation speed of the optical signal is determined based on a wavelength of the optical signal may occur. When optical signals are propagated to the optical fiber at the same speed (that is, when the chromatic dispersion is 0 ps/nm/km), a nonlinear distortion may occur due to chromatic dispersion. The nonlinear distortion may be referred as a "four-wave mixing (FWM)." Upstream channels and downstream channels may be determined based on a degree of chromatic dispersion occurring in the optical fiber, whether an FWM occurs, or a degree of an FWM.

In other words, the center wavelengths and the wavelength ranges of the upstream channels and downstream channels may be determined based on a relationship between the upstream channels and downstream channels, and a wavelength band (for example, a "zero-dispersion window 210") in which an FWM does not occur, that is, in which a degree of chromatic dispersion is zero. The zero-dispersion window 210 may be in a wavelength band of 1300 nm to 1324 nm. At least one of the wavelength channels (that is, at least one of the upstream channels or at least one of the downstream channels) may be included in the zero-dispersion window 210. To reduce the FWM, a number of wavelength channels in a wavelength band in which a value of chromatic dispersion is zero may be less than "2."

Among the wavelength channels of the optical network system, wavelength channels spaced apart by the same wavelength spacing from each other may be determined so that a number of wavelength channels included in the zero-dispersion window 210 may be less than "2" to reduce the FWM. For example, referring to FIG. 2, an upstream channel with a longest wavelength (that is, an upstream channel with the center wavelength $\lambda_{UC3}$) among the upstream channels may be included in the zero-dispersion window 210. Upstream channels other than the upstream channel with the longest wavelength and the downstream channels may be included in wavelength bands other than the zero-dispersion window 210. For example, when all the wavelength channels are included in an O-band, a center wavelength of each of the upstream channels may be included in a wavelength band of 1290 nm to 1305 nm since the upstream channel with the longest wavelength is included in the zero-dispersion window 210. Thus, the zero-dispersion window 210 may be located between the upstream channels and the downstream channels.

Figure 3:
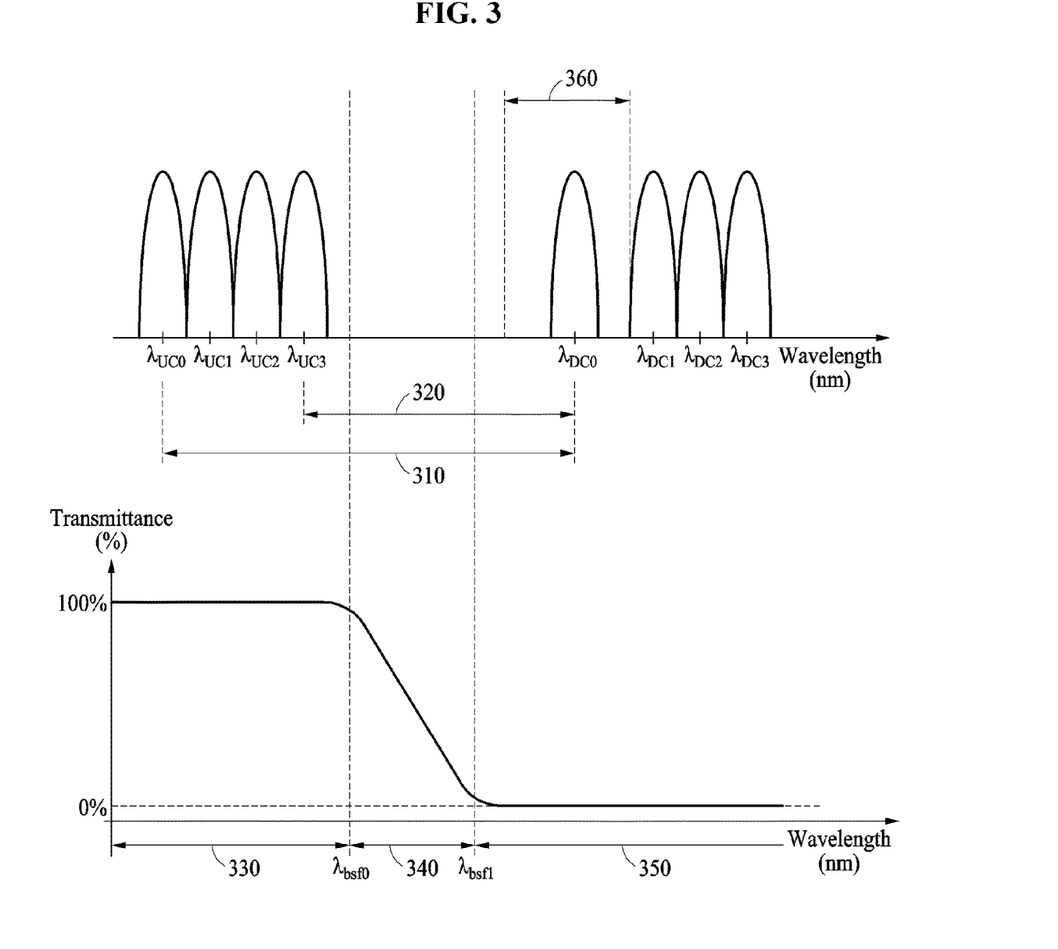
FIG. 3 is a diagram illustrating a relationship between a band splitting filter and wavelength channels used by the optical network system of FIG. 2.

FIG. 3 is a diagram illustrating a relationship between a band splitting filter and wavelength channels used by the optical network system of FIG. 2. An ONU of an optical network system according to an example embodiment may include a bidirectional optical sub assembly (BOSA) to output an optical signal of an upstream channel to a single optical fiber and to receive an optical signal of a downstream channel via the single optical fiber. The BOSA may include a band splitting filter. The band splitting filter may transmit, to an optical receiver of the BOSA, an optical signal that is generated in an OLT and that is transmitted via a downstream channel, and may transmit, to an optical fiber connected to the BOSA, an optical signal that is generated in an optical transmitter of the BOSA and that is to be transmitted via an upstream channel.

An upstream channel and a downstream channel may be spaced apart by a preset wavelength spacing from each other. The preset wavelength spacing may be greater than a wavelength spacing between upstream channels or a wavelength spacing between downstream channels. The preset wavelength spacing may be determined based on a performance of the band splitting filter. For example, a wavelength spacing between upstream channels and a wavelength spacing between downstream channels may be determined based on a transmittance characteristic of the band splitting filter. The transmittance characteristic of the band splitting filter may be determined based on an angle between an optical path and the band splitting filter in the BOSA.

In FIG. 3, a bottom graph illustrates a transmittance of the band splitting filter based on a wavelength. The band splitting filter may be located on an optical path of the optical transmitter and between the optical transmitter and the optical fiber. For example, when the optical transmitter outputs an optical signal of an upstream channel toward the band splitting filter, the band splitting filter may pass the output optical signal so that the output optical signal may be propagated toward the optical fiber located on the optical path of the optical transmitter. To pass the optical signal of the upstream channel, a transmittance of the band splitting filter may have a relatively high value at a wavelength corresponding to the upstream channel. Referring to FIG. 3, wavelengths of all the upstream channels may be included in a wavelength interval 330 in which an optical signal passes through the band splitting filter and that corresponds to a transmittance of about 100%.

Because the optical fiber is located on the optical path of the optical transmitter, an optical signal of a downstream channel output from the optical fiber may be propagated toward the optical transmitter. Because the band splitting filter is located between the optical transmitter and the optical fiber, the optical signal of the downstream channel may arrive at the band splitting filter before arriving at the optical transmitter. The band splitting filter may reflect the optical signal of the downstream channel so that the optical signal of the downstream channel output from the optical fiber may not be transferred to the optical transmitter.

The optical receiver may be located on an optical path of the reflected optical signal, and accordingly may receive the reflected optical signal. When the band splitting filter is perpendicular to the optical path of the optical transmitter, the optical signal of the downstream channel reflected by the band splitting filter may arrive at the optical fiber again. When the band splitting filter is not perpendicular to the optical path of the optical transmitter, the optical signal of the downstream channel reflected by the band splitting filter may be propagated toward another location inside the BOSA rather than the optical transmitter and the optical fiber. The optical receiver may be located on an optical path through which the optical signal of the downstream channel is reflected by the band splitting filter and is propagated.

To reflect the optical signal of the downstream channel, the band splitting filter may have a relatively low transmittance at a wavelength corresponding to the downstream channel. Referring to FIG. 3, wavelengths of all the downstream channels may be included in a wavelength interval 350 in which the band splitting filter reflects the optical signal and that corresponds to a transmittance of about 0%. When a center wavelength of a downstream channel is longer than a center wavelength of an upstream channel, the band splitting filter may be a low-pass filter (LPF).

Referring to FIG. 3, at a short wavelength, the band splitting filter may have a relatively high transmittance to pass an optical signal of an upstream channel. The transmittance of the band splitting filter may be gradually reduced from a threshold wavelength $\lambda_{bsf0}$. At a threshold wavelength $\lambda_{bsf1}$ longer than the threshold wavelength $\lambda_{bsf0}$, the transmittance of the band splitting filter may converge to a relatively low value to reflect an optical signal of a downstream channel.

Referring to FIG. 3, the transmittance of the band splitting filter may be classified based three wavelength intervals. The wavelength interval 330 may be a wavelength band shorter than the threshold wavelength $\lambda_{bsf0}$, and may correspond to a relative high transmittance. The wavelength interval 340 may be a wavelength band between the threshold wavelengths $\lambda_{bsf0}$ and $\lambda_{bsf1}$, and may correspond to a transmittance that gradually decreases based on a wavelength. The wavelength interval 350 may be a wavelength band longer than the threshold wavelength $\lambda_{bsf1}$, and may correspond to a relatively low transmittance. A length of the wavelength interval 340, that is, a difference between the threshold wavelengths $\lambda_{bsf0}$ and $\lambda_{bsf1}$, may be determined based on an angle between the band splitting filter and the optical path of the optical transmitter.

A wavelength spacing between the upstream channels and a wavelength spacing between the downstream channels in the optical network system may be determined based on the length of the wavelength interval 340 in which the transmittance of the band splitting filter gradually decreases based on the wavelength. Thus, a wavelength spacing between an upstream channel and a downstream channel may be greater than the wavelength spacing between the upstream channels and the wavelength spacing between the downstream channels. The wavelength interval 340 may be included in a wavelength spacing between an upstream channel and a downstream channel.

Referring to FIG. 3, a wavelength spacing 310 between center frequencies $\lambda_{UC0}$ and $\lambda_{DC0}$ may be greater than a wavelength spacing between center frequencies $\lambda_{UC0}$ and $\lambda_{UC1}$. For example, when the wavelength spacing between the center frequencies $\lambda_{UC0}$ and $\lambda_{UC1}$ is 4.7 nm corresponding to a frequency of about 800 gigahertz (GHz), the wavelength spacing 310 may be determined to be greater than or equal to 50 nm. For example, when the wavelength spacing 310 is 50 nm, the center frequency $\lambda_{DC0}$ may be included in a wavelength interval 360 that has a center frequency greater than the center frequency $\lambda_{UC0}$ by 50 nm. A width of the wavelength interval 360 may be 20 nm. In FIG. 3, the wavelength interval 360 may be greater than the wavelength interval 340 and may be included in the wavelength interval 350 corresponding to a relatively low transmittance. Also, the center wavelength $\lambda_{DC1}$ of a downstream channel near a downstream channel with the center wavelength $\lambda_{DC0}$ may be determined to be longer than the center wavelength $\lambda_{DC0}$ by 10 nm. Furthermore, a wavelength spacing between the center wavelengths $\lambda_{DC1}$ and $\lambda_{DC0}$ may be greater than or equal to 10 nm.

When center wavelengths of upstream channels are shorter than center wavelengths of downstream channels, an upstream channel with a longest center wavelength among the upstream channels may be spaced apart by a preset wavelength spacing from a downstream channel with a shortest center wavelength among the downstream channels. In other words, a wavelength spacing between the upstream channel with the longest center wavelength and the downstream channel with the shortest center wavelength may be greater than a wavelength spacing between the upstream channels and a wavelength spacing between the downstream channels. For example, a wavelength spacing 320 between the center wavelengths $\lambda_{UC3}$ and $\lambda_{DC0}$ may be greater than a wavelength spacing between the center wavelengths $\lambda_{UC2}$ and $\lambda_{UC3}$.

Figure 4:
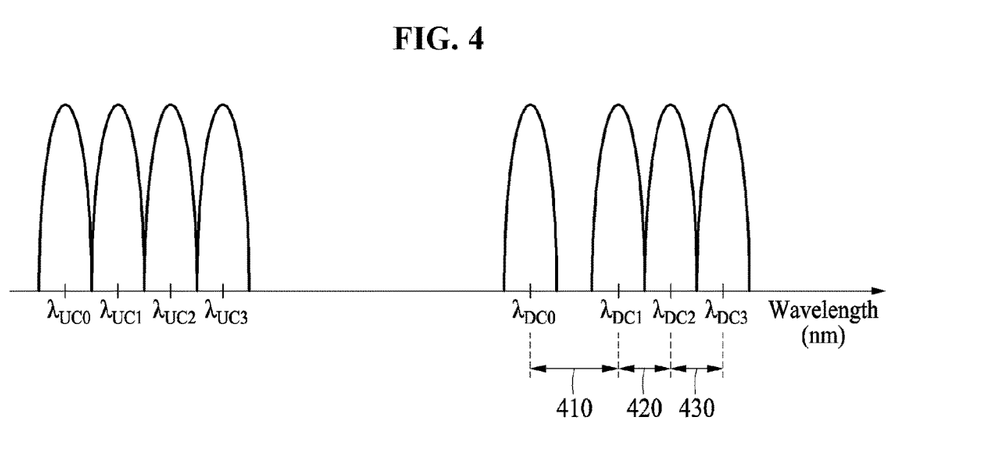
FIG. 4 is a diagram illustrating a relationship between a downstream optical signal selection filter and wavelength channels used by the optical network system of FIG. 2.

FIG. 4 is a diagram illustrating a relationship between a downstream optical signal selection filter and wavelength channels used by the optical network system of FIG. 2.

An optical signal transmitted to a BOSA of an ONU via a downstream channel may pass through a band splitting filter that separates downstream channels and upstream channels, and then may pass through a downstream optical signal selection filter that is a band-pass filter located in front of an optical receiver. The downstream optical signal selection filter may select optical signals of different downstream channels and may transfer the selected optical signals to the optical receiver. Center wavelengths and wavelength ranges of the downstream channels may be determined based on a wavelength separation performance of the downstream optical signal selection filter. For example, a spacing between the downstream channels or a spacing between center wavelengths of the downstream channels may be determined based on the wavelength separation performance of the downstream optical signal selection filter. When the spacing between the downstream channels or the spacing between the center wavelengths of the downstream channels increases, a wavelength separation condition of the downstream optical signal selection filter may be mitigated. When the wavelength separation condition of the downstream optical signal selection filter is mitigated, a manufacturing cost of the BOSA may be reduced. The wavelength separation condition of the downstream optical signal selection filter may be determined based on an angle between an optical path and the downstream optical signal selection filter.

A wavelength spacing 410 between a center wavelength $\lambda_{DC0}$ of a downstream channel DC0 and a center wavelength $\lambda_{DC1}$ of a downstream channel DC1 among the downstream channels may be greater than a wavelength spacing between the other downstream channels (for example, a wavelength spacing 420 between center wavelengths of the downstream channel DC1 and a downstream channel DC2, and a wavelength spacing 430 between center wavelengths of the downstream channel DC2 and a downstream channel DC3), based on the wavelength separation performance of the downstream optical signal selection filter. The center wavelengths $\lambda_{DC0}$ and $\lambda_{DC1}$ may be a shortest center wavelength and a second shortest center wavelength among center wavelengths of the downstream channels. For example, when "N+1" downstream channels are classified into downstream channels DC0 through DCN in an ascending order of center wavelengths, a spacing (that is, $\lambda_{DC1}-\lambda_{DC0}$) between center wavelengths of the downstream channels DC0 and DC1 may be greater than a spacing (that is, $\lambda_{DCk}-\lambda_{DCk-1}$) between center wavelengths of downstream channels DCk-1 and DCk in which k is an integer that is greater than or equal to "3" and less than or equal to "N."

Figure 5:
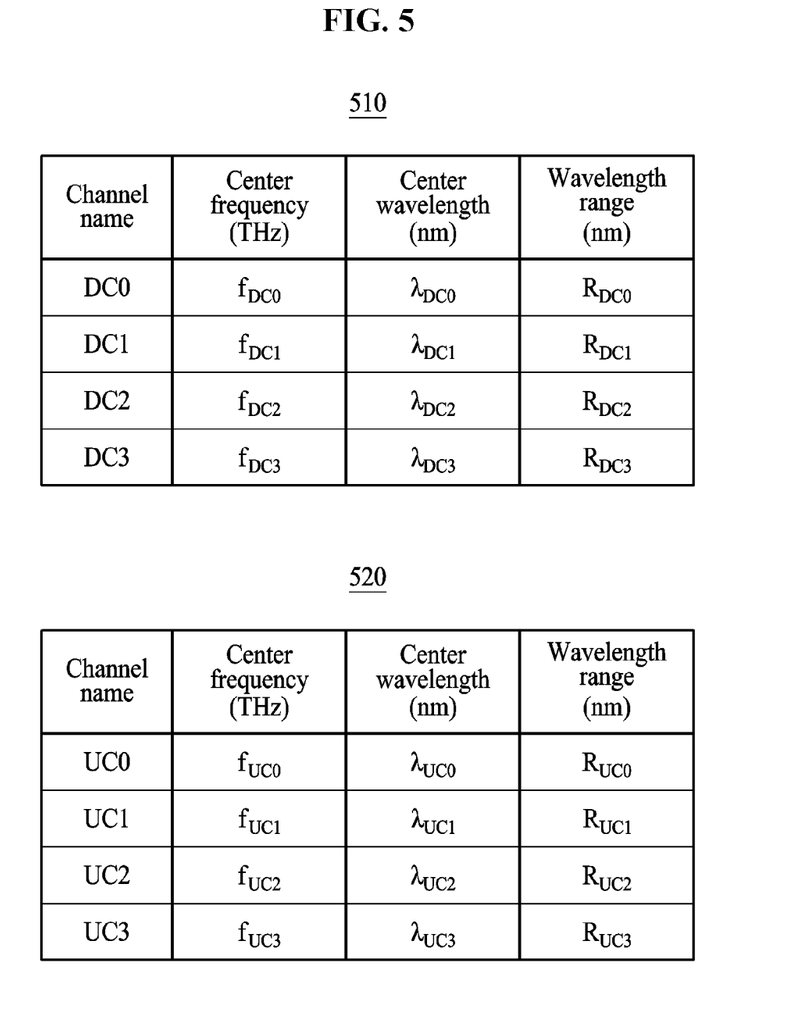
FIG. 5 illustrates center frequencies, center wavelengths and wavelength ranges of wavelength channels used by an optical network system according to an example embodiment.

FIG. 5 illustrates center frequencies, center wavelengths and wavelength ranges of wavelength channels used by an optical network system according to an example embodiment. In the following description, it is assumed that four downstream channels and four upstream channels are used by the optical network system and that each of the wavelength channels support a transmission of an optical signal at a transmission rate of up to 25 Gb/s. In FIG. 5, a table 510 shows center frequencies, center wavelengths and wavelength ranges of downstream channels, and a table 520 shows center frequencies, center wavelengths and wavelength ranges of upstream channels, among the wavelength channels.

In the table 510, the four downstream channels are denoted by DC0, DC1, DC2 and DC3 in an ascending order of center wavelengths. Center frequencies of the downstream channels DC0, DC1, DC2 and DC3 are denoted by $f_{DC0}$, $f_{DC1}$, $f_{DC2}$ and $f_{DC3}$, respectively. The center wavelengths of the downstream channels DC0, DC1, DC2 and DC3 are denoted by $\lambda_{DC0}$, $\lambda_{DC1}$, $\lambda_{DC2}$ and $\lambda_{DC3}$, respectively. Wavelength ranges of the downstream channels DC0, DC1, DC2 and DC3 are denoted by $R_{DC0}$, $R_{DC1}$, $R_{DC2}$ and $R_{DC3}$, respectively. A frequency spacing (for example, $f_{DC2}$-$f_{DC1}$) between the downstream channels may be 800 GHz corresponding to a center wavelength of 4.7 nm, so that a device of the optical network system may utilize an extended 100G Ethernet part. When the downstream channels have the same frequency spacing as 800 GHz, a cyclic arrayed waveguide (AWG) may be utilized to connect an OLT and an ONU.

Spacings between center frequencies of downstream channels, or spacings between center wavelengths may be set to be different from each other. A spacing between center wavelengths of downstream channels may be determined based on a filtering performance of a downstream optical signal selection filter that performs filtering of an optical signal of a downstream channel based on a center wavelength of the downstream channel. For example, based on the filtering performance of the downstream optical signal selection filter, a wavelength spacing between two downstream channels (for example, the downstream channels DC0 and DC1) with relatively short center wavelengths may be set to be longer than a wavelength spacing between the other neighboring downstream channels. In other words, a value of "$\lambda_{DC0}$-$\lambda_{DC1}$" may be greater than a value of "$\lambda_{DCk}$-$\lambda_{DCk+1}$" in which k is a natural number greater than or equal to "1."

In the table 520, the four upstream channels are denoted by UC0, UC1, UC2 and UC3 in an ascending order of center wavelengths. Center frequencies of the upstream channels UC0, UC1, UC2 and UC3 are denoted by $f_{UC0}$, $f_{UC1}$, $f_{UC2}$ and $f_{UC3}$, respectively. The center wavelengths of the upstream channels UC0, UC1, UC2 and UC3 are denoted by $\lambda_{UC0}$, $\lambda_{UC1}$, $\lambda_{UC2}$, and $\lambda_{UC3}$, respectively. Wavelength ranges of the upstream channels UC0, UC1, UC2 and UC3 are denoted by $R_{UC0}$, $R_{UC1}$, $R_{UC2}$ and $R_{UC3}$, respectively. A frequency spacing (for example, $f_{UC2}$-$f_{UC1}$) between the upstream channels may be 800 GHz corresponding to a center wavelength of 4.7 nm, so that a device of the optical network system may utilize an extended 100G Ethernet part. When the upstream channels have the same frequency spacing as 800 GHz, a cyclic AWG may be utilized to connect an OLT and an ONU.

For example, when wavelength channels are determined based on LAN-WDM LR4/ER4 wavelengths, the center frequencies $f_{UC0}$, $f_{UC1}$, $f_{UC2}$ and $f_{UC3}$ may be 232.2 THz, 231.4 THz, 230.6 THz, and 229.8 THz, respectively. Also, the center frequencies $f_{UC0}$, $f_{UC1}$, $f_{UC2}$ and $f_{UC3}$ may be 231.4 THz, 230.6 THz, 229.8 THz, and 229.0 THz, respectively. A center frequency of at least one of upstream channels may be a center frequency included in a zero-dispersion window, and may be determined to be one of 230.2 THz, 230.0 THz, 229.8 THz, 229.6 THz, 229.4 THz, 229.2 THz and 229.0 THz that are LAN-WDM LR4/ER4 wavelengths.

When values of chromatic dispersion of a plurality of optical signals that are simultaneously propagated to an optical fiber via different wavelength channels are the same, an FWM may occur due to an interaction between the plurality of optical signals. To prevent an occurrence of the FWM, a wavelength channel may not be included or a single wavelength channel may be included in a wavelength band with the same value of chromatic dispersion. The wavelength band with the same value of chromatic dispersion may include, for example, a zero-dispersion window that is a wavelength band of 1300 nm to 1324 nm in which the chromatic dispersion has a value of zero. Optical signals having wavelengths included in the zero-dispersion window may be distorted by the FWM due to the zero chromatic dispersion.

Upstream channels other than an upstream channel (for example, an upstream channel with a shortest wavelength or an upstream channel with a longest wavelength) may be included in wavelength bands other than the zero-dispersion window in an O-band. Downstream channels other than a downstream channel (for example, a downstream channel with a shortest wavelength or a downstream channel with a longest wavelength) may be included in the wavelength bands other than the zero-dispersion window in the O-band. A number of upstream channels included in the zero-dispersion window or a number of downstream channels included in the zero-dispersion window may be less than or equal to "1."

For example, when an upstream channel with a longest wavelength among upstream channels is included in a zero-dispersion window, the center wavelength $\lambda_{UC3}$ of the upstream channel UC3 with a longest wavelength may be included in a wavelength band of 1300 nm to 1324 nm (for example, a wavelength band of 1300 nm to 1304 nm). The center wavelengths $\lambda_{UC0}$ through $\lambda_{UC2}$ and $\lambda_{DC0}$ through $\lambda_{DC3}$ other than the center wavelength $\lambda_{UC3}$ may be included in wavelength bands other than the zero-dispersion window. Thus, in the optical network system, transmission rates of optical signals with different wavelengths may be different from each other, and an occurrence of an FWM may be prevented.

A wavelength spacing between upstream channels and downstream channels may be longer than a wavelength spacing between the upstream channels or a wavelength spacing between the downstream channels. The wavelength spacing between the upstream channels and the downstream channels may be determined based on a feature of a band splitting filter included in a BOSA used in the optical network system. A feature of the band splitting filter that has an influence on the wavelength spacing may include, for example, a transmittance transition interval in which a transmittance of the band splitting filter gradually changes based on a wavelength. For example, when the band splitting filter is an LPF that passes an optical signal of a relatively short wavelength band, a transmittance transition interval may refer to an interval in which a high transmittance that allows an optical signal to pass is changed to a low transmittance that blocks an optical signal.

For example, when a center wavelength of an upstream channel is shorter than a center wavelength of a downstream channel, a band splitting filter of an ONU may need to transmit an optical signal of the upstream channel from an optical transmitter to an optical fiber. Accordingly, the band splitting filter of the ONU may be an LPF that passes an optical signal of an upstream channel. In this example, a transmittance transition interval may be included between the upstream channel UC3 with the longest wavelength among upstream channels and the downstream channel DC0 with the shortest wavelength. In other words, a spacing, that is, $\lambda_{DC0}$-$\lambda_{UC3}$ between the center wavelength $\lambda_{UC3}$ of the upstream channel UC3 and the center wavelength $\lambda_{DC0}$ of the downstream channel DC0 may be greater than a length of the transmittance transition interval.

Figure 6:
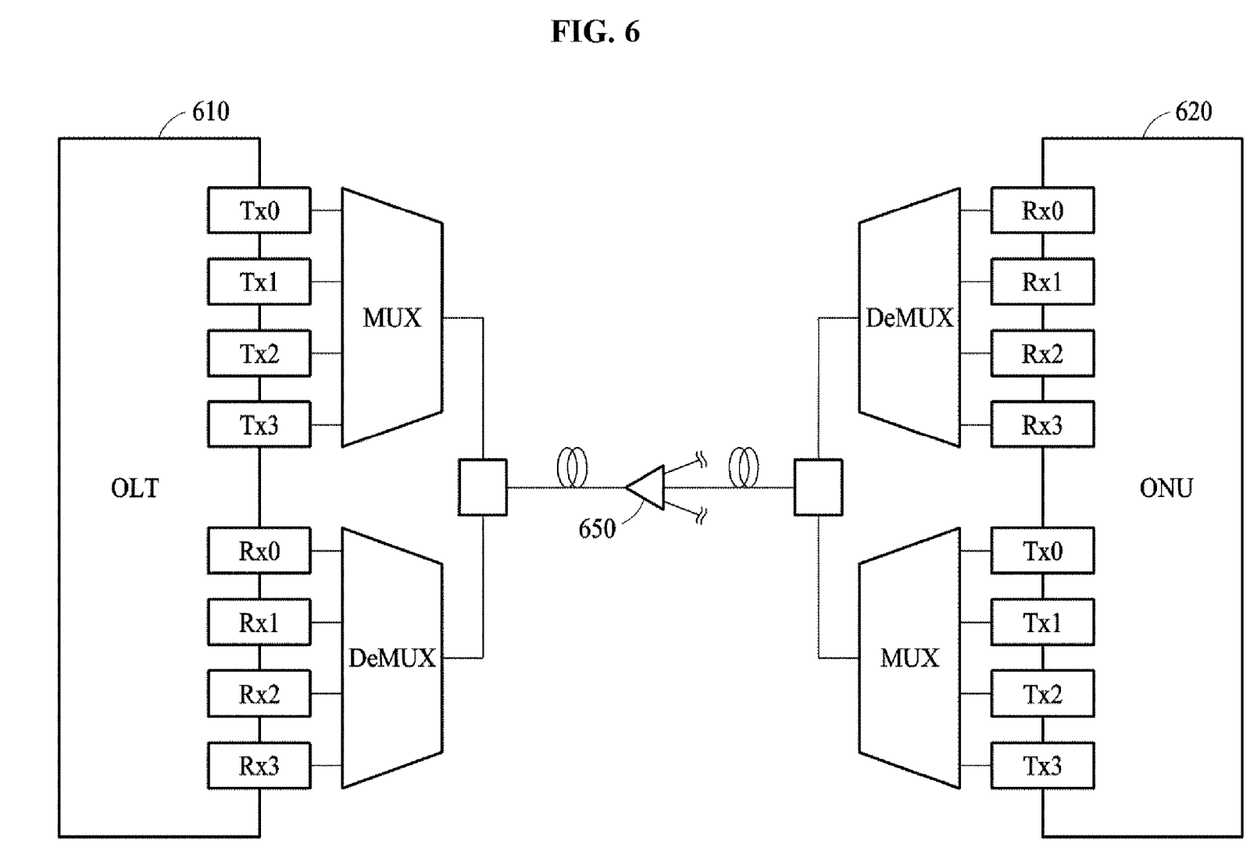
FIG. 6 is a diagram illustrating another example of a structure of an optical network system according to an example embodiment.

FIG. 6 is a diagram illustrating another example of a structure of an optical network system according to an example embodiment. The optical network system may use four upstream channels and four downstream channels based on a 100G EPON, and may support a transmission rate of 25 Gb/s per wavelength channel. In the optical network system, an OLT 610 and an ONU 620 may perform a downstream transmission of optical signals at a transmission rate of up to 100 Gb/s using all the four downstream channels that support the transmission rate of 25 Gb/s. Similarly, the OLT 610 and the ONU 620 may perform an upstream transmission of optical signals at a transmission rate of up to 100 Gb/s using all the four upstream channels that support the transmission rate of 25 Gb/s.

Referring to FIG. 6, the OLT 610 may include optical transmitters Tx0 through Tx3 configured to generate optical signals with wavelengths corresponding to the four downstream channels, respectively. Each of the optical transmitters Tx0 through Tx3 may include a laser diode (LD) that uses a wavelength of a corresponding downstream channel, and the LD may include, for example, an uncooled distributed feedback (DFB) LD and a cooled electro-absorption modulated laser (EML). Optical signals generated by the optical transmitters Tx0 through Tx3 may be multiplexed into a single optical fiber using an optical multiplexer (MUX), and may be output to an ODN. An optical splitter 650 of the ODN may distribute the optical signals output from the OLT 610, at the same intensity toward a plurality of ONUs connected to the OLT 610. The ONU 620 may separate the optical signals for each of the downstream channels using an optical demultiplxer (DeMUX), and may perform photoelectric conversion to convert the optical signals using optical receivers Rx0 through Rx3 respectively corresponding to the downstream channels. Each of the optical receivers Rx0 through Rx3 may include a photodiode configured to perform photoelectric conversion to convert an optical signal.

Similarly, the ONU 620 may include optical transmitters Tx0 through Tx3 configured to generate optical signals with wavelengths corresponding to the four upstream channels, respectively. Each of the optical transmitters Tx0 through Tx3 may include an LD that uses a wavelength of a corresponding upstream channel, and the LD may include, for example, an uncooled DFB LD and a cooled EML. Optical signals generated by the optical transmitters Tx0 through Tx3 may be multiplexed into a single optical fiber using an optical MUX, and may be output to the ODN. The optical splitter 650 may multiplex optical signals of a plurality of ONUs into a single optical fiber connected to the OLT 610. The OLT 610 may separate the optical signals for each of the upstream channels using an optical DeMUX, and may perform photoelectric conversion to convert the optical signals using optical receivers Rx0 through Rx3 respectively corresponding to the upstream channels. Each of the optical receivers Rx0 through Rx3 may include a photodiode configured to perform photoelectric conversion to convert an optical signal.

The OLT 610 and the ONU 620 may each include an optical device (for example, a an LD, an optical filter, and the like) used in an Ethernet network that supports a transmission rate of 100 Gb/s. When a number of upstream channels and a number of downstream channels exceed "4," the OLT 610 and the ONU 620 may each include a device used in an extended 100G Ethernet.

Wavelength channels may be determined based on LAN-WDM LR4/ER4 wavelengths. A spacing between upstream channels or a spacing between downstream channels may be greater than or equal to 0.8 GHz. For example, a spacing between upstream channels or a spacing between downstream channels may be 800 GHz (corresponding to about 4.7 nm). When a spacing between upstream channels or a spacing between downstream channels is 800 GHz (corresponding to about 4.7 nm), each of the OLT 610 and the ONU 620 may include a DFB-LD manufactured using a semiconductor material as a light source used in an optical transceiver. Also, each of the OLT 610 and the ONU 620 may include an optical device used to transmit a 100G Ethernet optical signal.

A DFB-LD may be a device configured to convert an electrical signal into an optical signal using a direct modulation scheme. Heat may be generated in an electrophotic conversion process of the DFB-LD, and the generated heat may have an influence on a characteristic of a semiconductor material of the DFB-LD. Thus, heat generated while the DFB-LD generates an optical signal may have an influence on a wavelength of an optical signal output from the DFB-LD. Generally, when an operating temperature of the DFB-LD changes by 10° C., a wavelength of an optical signal output from the DFB-LD may be changed up to 100 GHz. When a spacing between upstream channels or a spacing between downstream channels is 800 GHz (corresponding to about 4.7 nm), an operating temperature range of the DFB-LD may be extended to 80° C. Thus, the DFB-LD may generate an optical signal of a corresponding wavelength channel even when a temperature of the DFB-LD is not precisely adjusted.

Figure 7:
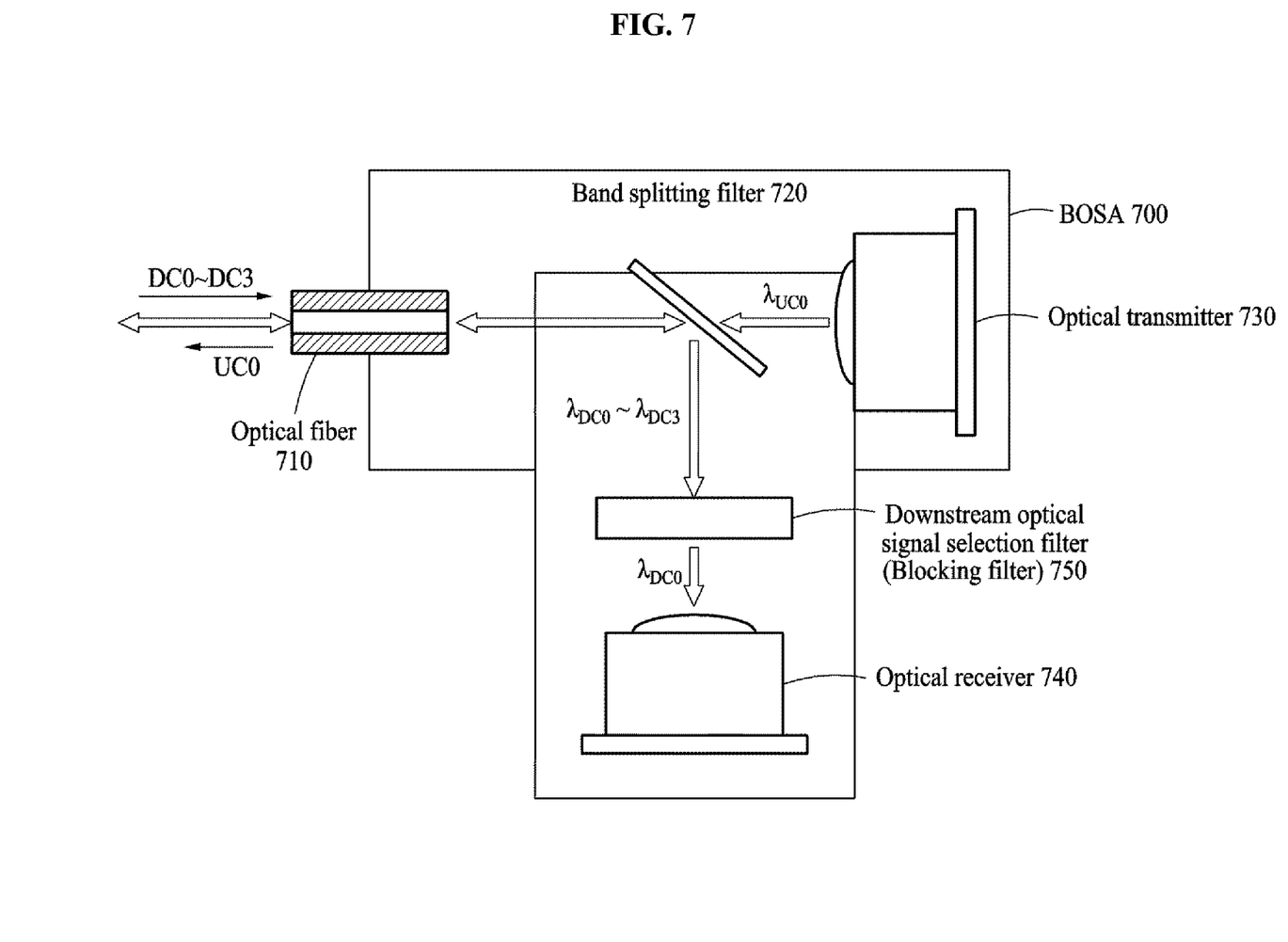
FIG. 7 is a diagram illustrating a structure of a bidirectional optical sub assembly (BOSA) used in an optical network system according to an example embodiment.

FIG. 7 is a diagram illustrating a structure of a BOSA 700 used in an optical network system according to an example embodiment. The BOSA 700 may be included in an ONU or an OLT of the optical network system. The BOSA 700 may allow the ONU or the OLT to simultaneously transmit and receive optical signals using a single optical filter 710. In the following description, the BOSA 700 is assumed to be included in the ONU.

The BOSA 700 may convert an electrical signal generated in the ONU or the OLT into an optical signal and may output the optical signal to an ODN. Referring to FIG. 7, the BOSA 700 may include an optical transmitter 730 configured to convert an electrical signal into an optical signal. A wavelength used by the optical transmitter 730 may be at least one of wavelength channels used in the optical network system. Because the BOSA 700 is included in the ONU, the optical transmitter 730 may transmit the optical signal to the OLT via an upstream channel. For example, the optical transmitter 730 may generate an optical signal using at least one of upstream channels. In FIG. 7, the optical transmitter 730 may output an optical signal with a center wavelength $\lambda_{UC0}$ of an upstream channel UC0 among the upstream channels. The optical signal output by the optical transmitter 730 may include data generated at a higher layer than a physical layer corresponding to the BOSA 700. Also, the data may be data generated from a terminal of a subscriber connected to the ONU.

The optical signal of the upstream channel generated by the optical transmitter 730 may be propagated to a band splitting filter 720. The upstream channels may be included in a passband that is a range of wavelengths that pass through the band splitting filter 720, and downstream channels may be included in a reflection band reflected by the band splitting filter 720. A wavelength spacing between the upstream channels and downstream channels may be a wavelength band between the passband and the reflection band, and may correspond to a transmittance transition band in which a transmittance of the band splitting filter 720 gradually changes based on a wavelength. The upstream channel may be included in the passband of the band splitting filter 720, and accordingly the optical signal generated by the optical transmitter 730 may pass through the band splitting filter 720. The optical signal passing through the band splitting filter 720 may be collimated in the optical filter 710. The optical signal may be transmitted to the OLT via the optical filter 710.

The OLT may be connected to a plurality of ONUs. The OLT may simultaneously transmit optical signals to the plurality of ONUS using all the downstream channels. Accordingly, the BOSA 700 may receive optical signals of all the downstream channels (for example, downstream channels DC0 through DC3 of FIG. 7) via the optical filter 710. The optical signals of the OLT output from the optical filter 710 may reach the band splitting filter 720. As described above, the downstream channels may be included in the reflection band of the band splitting filter 720, and accordingly a plurality of optical signals with different center wavelengths (that is, optical signals transferred via different downstream channels) may be reflected by the band splitting filter 720.

Referring to FIG. 7, the band splitting filter 720 may be inclined on an optical path of the optical filter 710 at a predetermined angle with respect to the optical path. Accordingly, optical signals reflected by the band splitting filter 720 may not be propagated to the optical filter 710 again. The reflected optical signals may be propagated toward the optical receiver 740 instead of being propagated to the optical filter 710 again.

Because the OLT simultaneously transmits optical signals to the plurality of ONUs using all the downstream channels, optical signals transferred using different downstream channels may arrive at different ONUs. The band splitting filter 720 may reflect the optical signals of all the downstream channels to the optical receiver 740, and accordingly may need to filter only an optical signal that is to arrive at the ONU including the BOSA 700 and need to transmit the filtered optical signal to the optical receiver 740.

Referring to FIG. 7, the BOSA 700 may include a downstream optical signal selection filter 750 that is a blocking filter to pass only an optical signal of a specific downstream channel and that is located between the optical receiver 740 and the band splitting filter 720. The downstream optical signal selection filter 750 may pass a downstream channel used by the ONU including the BOSA 700. A spacing between the downstream channels may be determined based on a performance of the downstream optical signal selection filter 750 to select an optical signal of a downstream channel. In other words, a wavelength spacing between the downstream channels may be determined based on a wavelength spacing between a wavelength band passing through the downstream optical signal selection filter 750 and a wavelength band blocked by the downstream optical signal selection filter 750.

Thus, among optical signals of different downstream channels transmitted by the OLT, only an optical signal of a downstream channel used by the ONU may pass through the downstream optical signal selection filter 750. The optical signal passing through the downstream optical signal selection filter 750 may arrive at the optical receiver 740. The optical receiver 740 may convert the optical signal into an electrical signal. Data included in the electrical signal may be transferred to a higher layer than a physical layer corresponding to the optical receiver 740. Also, the data included in the electrical signal may be transferred to a subscriber connected to the ONU.

An operation of the BOSA 700 has been described above under the assumption that the BOSA 700 is included in the ONU. For example, when the BOSA 700 is included in the OLT, the BOSA 700 may operate similarly. In this example, the optical transmitter 730 of the BOSA 700 may convert an electrical signal transferred by a backbone network connected to the OLT into an optical signal. A wavelength used when the optical transmitter 730 converts the electrical signal may be a center wavelength of at least one of the downstream channels. For example, the optical transmitter 730 may generate an optical signal of a downstream channel allocated to an ONU connected to a subscriber to which an electrical signal transferred by the backbone network is to be received. The generated optical signal may be collimated in the optical filter 710 by passing through the band splitting filter 720. The optical signal collimated in the optical filter 710 may be transmitted to the ONU.

When the BOSA 700 is included in the OLT, a downstream channel may be included in the passband of the band splitting filter 720, and an upstream channel may be included in the reflection band of the band splitting filter 720. For example, when a center wavelength of a downstream channel is longer than a center wavelength of an upstream channel, band splitting filter 720 may be a high-pass filter (HPF) that passes the downstream channel with the longer center wavelength.

Optical signals generated by the plurality of ONUs connected to the OLT may be propagated into the BOSA 700 using a single optical filter, for example, the optical filter 710. The generated optical signals may be propagated via the upstream channels. Because an upstream channel is included in the reflection band of the band splitting filter 720, the optical signals propagated into the BOSA 700 may be reflected at the band splitting filter 720. The reflected optical signals may be propagated to the optical receiver 740. An upstream optical signal selection filter may be located between the band splitting filter 720 and the optical receiver 740, and may be configured to select an optical signal of a specific upstream channel, to transfer the selected optical signal to the optical receiver 740, and to block optical signals of upstream channels other than the specific upstream channel. The optical receiver 740 may perform photoelectric conversion to convert the received optical signal. An electrical signal generated through the photoelectric conversion by the optical receiver 740 may be transferred to a higher layer than the physical layer corresponding to the BOSA 700. Also, data included in the electrical signal may be transferred to the backbone network connected to the OLT.

Figure 8:
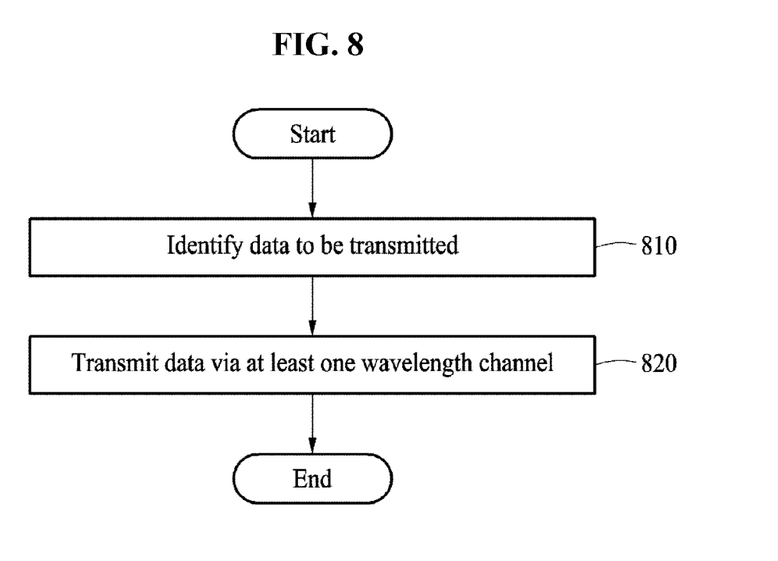
FIG. 8 is a flowchart illustrating operations performed to transmit data by an optical line terminal (OLT) and an optical network unit (ONU) in an optical network system according to an example embodiment.

FIG. 8 is a flowchart illustrating operations performed to transmit data by an OLT and an ONU in an optical network system according to an example embodiment.

Referring to FIG. 8, in operation 810, the OLT and the ONU may identify data that is to be transmitted. The OLT may receive, from a backbone network connected to the OLT, data that is to be transmitted to the ONU. The ONU may identify data that is to be transmitted to the OLT from a subscriber connected to the ONU.

In operation 820, the OLT and the ONU may transmit the identified data via at least one wavelength channel used in the optical network system. For example, the OLT may transmit data to the ONU using at least one of a plurality of downstream channels. A number of downstream channels used by the OLT to transmit data may be determined based on a transmission rate supported by the ONU and use states of the downstream channels. For example, when a maximum transmission rate supported by a single wavelength channel is 25 Gb/s and when a maximum transmission rate supported by the ONU is 50 Gb/s, the OLT may transmit data using up to two downstream channels. Because the maximum transmission rate of 50 Gb/s is supported by the ONU, two downstream channels may be used. When one of the two downstream channels is being used by the ONU, the OLT may transmit data using the other downstream channel.

For example, the ONU may transmit data to the OLT using at least one of a plurality of upstream channels. The OLT may select at least one upstream channel that is to be used to transmit data by the ONU, based on a use state of each of the plurality of upstream channels. The ONU may transmit data using the at least one selected upstream channel.

Figure 9:
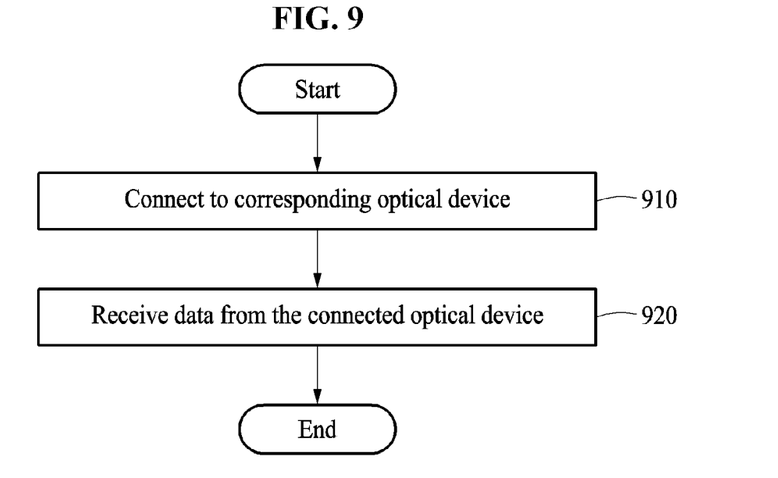
FIG. 9 is a flowchart illustrating operations performed to receive data by an OLT and an ONU in an optical network system according to an example embodiment.

FIG. 9 is a flowchart illustrating operations performed to receive data by an OLT and an ONU in an optical network system according to an example embodiment.

Referring to FIG. 9, in operation 910, each of the OLT and the ONU may be connected to a corresponding optical device. The OLT may be connected to at least one ONU. The ONU may be connected to a single OLT. Thus, a single OLT and a plurality of ONU may be connected to each other.

In operation 920, each of the OLT and the ONU may receive data from the connected optical device. The OLT may receive data from the ONU using at least one upstream channel. The ONU may receive data from the OLT using at least one downstream channel.

As described above, wavelength channels used in an optical network system may be classified into downstream channels used to transmit optical signals from an OLT to an ONU, and upstream channels used to transmit optical signals from the ONU to the OLT. To support a transmission of optical signals using a WDM scheme, at least two downstream channels and at least two upstream channels may be provided. In this example, a transmission rate of each of the OLT and the ONU may be increased by a value obtained by applying a number of wavelength channels that may be simultaneously used by the OLT and the ONU to a transmission rate of a single wavelength channel. The wavelength channels may be included in an O-band and may not overlap each other. In a wavelength domain or a frequency domain, upstream channels may be located adjacent to each other, and downstream channels may be located adjacent to each other. In other words, a downstream channel may not be located between the upstream channels, and an upstream channel may not be located between the downstream channels. A wavelength spacing between the upstream channels and the downstream channels may be determined based on a performance of separating the upstream channels and the downstream channels in a BOSA of the ONU.

Center wavelengths, center frequencies and wavelength ranges of wavelength channels may be determined based on wavelength channels used in a 100G Ethernet. Upstream channels may be spaced apart at equal spacings, and a spacing between the upstream channels may be determined to use an optical device of the 100G Ethernet. To prevent an FWM, one of the upstream channels may be allocated to a wavelength band (for example, a zero-dispersion window) in which the FWM occurs. Also, a wavelength spacing between the downstream channels may be determined based on a performance of separating the downstream channels in the BOSA.

According to example embodiments, an optical network system may use wavelength channels included in an O-band. Also, according to example embodiments, a wavelength spacing between an upstream channel and a downstream channel in an optical network system may be set based on a performance of a band splitting filter of a BOSA.

In addition, according to example embodiments, an upstream channel and a downstream channel in an optical network system may be set based on a zero-dispersion window included in an O-band.

Furthermore, according to example embodiments, a wavelength spacing between downstream channels of an optical network system may be set based on a downstream optical signal selection filter that separates the downstream channels.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The optical network system, apparatuses, and other components described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as DC-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data transmission method performed by an optical line terminal (OLT), the data transmission method comprising:
    identifying data that is to be transmitted to an optical network unit (ONU) connected to the OLT; and
    transmitting the data to the ONU via at least one of wavelength channels used for an optical transmission between the OLT and the ONU,
    wherein the wavelength channels comprise a plurality of upstream channels that are used for an upstream transmission from the ONU to the OLT and a plurality of downstream channels that are used for a downstream transmission from the OLT to the ONU,
    wherein the wavelength channels do not overlap each other,
    wherein a center wavelength of the upstream channels is shorter than a center wavelength of the downstream channels, and
    wherein an upstream channel with a longest wavelength among the plurality of upstream channels is allocated in a zero dispersion window.

2. The data transmission method of claim 1, wherein the upstream channels and the downstream channels are included in O-band.

3. The data transmission method of claim 1, wherein:
    the downstream channels are classified into a first downstream channel through an N-th downstream channel, and
    a spacing between the first downstream channel and a second downstream channel is greater than a spacing between an (N−1)-th downstream channel and the N-th downstream channel.

4. A data reception method performed by an optical line terminal (OLT), the data reception method comprising:
    performing a connection to an optical network unit (ONU); and
    receiving data from the ONU via at least one of wavelength channels used for an optical transmission between the OLT and the ONU,
    wherein the wavelength channels comprise a plurality of upstream channels that are used for an upstream transmission from the ONU to the OLT and a plurality of downstream channels that are used for a downstream transmission from the OLT to the ONU,
    wherein the wavelength channels do not overlap each other,
    wherein a center wavelength of the upstream channels is shorter than a center wavelength of the downstream channels, and
    wherein an upstream channel with a longest wavelength among the plurality of upstream channels is allocated in a zero dispersion window.

5. The data reception method of claim 4, wherein an upstream channel with a longest wavelength among the upstream channels is included in a preset wavelength band.

6. The data reception method of claim 4, wherein the upstream channels and the downstream channels are included in O-band.

7. The data reception method of claim 4, wherein:
    the downstream channels are classified into a first downstream channel through an N-th downstream channel, and
    a spacing between the first downstream channel and a second downstream channel is greater than a spacing between an (N−1)-th downstream channel and the N-th downstream channel.

8. A data transmission method performed by an optical network unit (ONU), the data transmission method comprising:
    identifying data that is to be transmitted to an optical line terminal (OLT) connected to the ONU; and
    transmitting the data to the OLT via at least one of wavelength channels used for an optical transmission between the OLT and the ONU,
    wherein the wavelength channels comprise a plurality of upstream channels that are used for an upstream transmission from the ONU to the OLT and a plurality of downstream channels that are used for a downstream transmission from the OLT to the ONU,
    wherein the wavelength channels do not overlap each other,
    wherein a center wavelength of the upstream channels is shorter than a center wavelength of the downstream channels, and
    wherein an upstream channel with a longest wavelength among the plurality of upstream channels is allocated in a zero dispersion window.

9. The data transmission method of claim 8, wherein an upstream channel with a longest wavelength among the upstream channels is included in a preset wavelength band.

10. The data transmission method of claim 8, wherein at least one of the upstream channels and the downstream channels are included in O-band.

11. The data transmission method of claim 8, wherein:
the downstream channels are classified into a first downstream channel through an N-th downstream channel, and
a spacing between the first downstream channel and a second downstream channel is greater than a spacing between an (N−1)-th downstream channel and the N-th downstream channel.

\* \* \* \* \*